Sept. 8, 1964

P. K. GOETHE ETAL

MAGNETIC CORES HEMETICALLY SEALED WITHIN
ANODIZED ALUMINUM CORE BOXES

Original Filed Aug. 1, 1958

3,148,346

WITNESSES
John E. Hensley Jr
Leon M. Garman

INVENTORS
Paul K. Goethe &
Clifford C. Horstman
BY
H. L. Towle
ATTORNEY 3,148,346
MAGNETIC CORES HERMETICALLY SEALED WITHIN ANODIZED ALUMINUM CORE BOXES
Paul K. Goethe, Sharon, and Clifford C. Horstman, Sharpsville, Pa., assignors to Westinghouse Electric Corporation, East Pittsburgh, Pa., a corporation of Pennsylvania
Original application Aug. 1, 1958, Ser. No. 752,549, now Patent No. 3,106,769, dated Oct. 15, 1963. Divided and this application Nov. 6, 1961, Ser. No. 150,243
4 Claims. (Cl. 336—96)

The present invention relates to magnetic cores and has particular reference to toroidal cores enclosed within hermetically sealed metal core boxes.

This application is a division of application Serial No. 752,549, filed August 1, 1958, now Patent No. 3,106,769.

Toroidal cores, formed from nickel-iron alloys or other magnetic alloys, frequently are used in saturable reactors for regulator or magnetic amplifier circuits. To avoid stress and strain in the magnetic alloys, the cores generally are enclosed in metal boxes. Coils are formed by winding wire on the core box.

Since the core box, after receiving the copper windings, may be subjected to various encapsulation and vacuum impregnation treatments, it is necessary that the core box be hermetically sealed to prevent entrance of any of the encapsulating or impregnating resins. If any of such resins penetrate into the box and harden on or between core turns, the magnetic properties of the core will be changed to such an extent that the usefulness of the core is substantially reduced or destroyed completely.

Another object of this invention is to provide magnetic cores sealed hermetically in metal core boxes by a relatively thick coating of a resin applied by a fluidizing process.

Other and further objects of the invention will, in part, be obvious and will, in part, appear hereinafter.

In order to provide a more complete understanding of the present invention reference is made to the following description taken in conjunction with the accompanying drawing, in which.

In accordance with the present invention and in the attainment of the foregoing object, magnetic cores are hermetically sealed within metal core boxes by coating the complete exterior surface of the box with a 4 to 50 mil thick resin coating applied by a fluidizing process.

Figure 1:
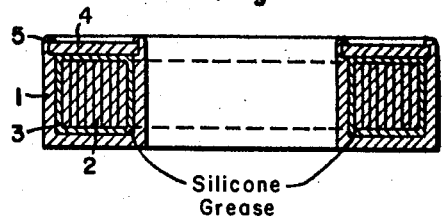
FIGURE 1 is a vertical cross-sectional view of a core box, illustrating a magnetic core packed in silicone grease.

In preparing magnetic cores in accordance with this invention core boxes, illustrated in FIG. 1 and referred to by reference numeral 1, comprising an annular trough-shaped member, are employed which have been machined in a known manner to provide center flange closing, rolled over top closing, or the like. Aluminum is a particularly satisfactory metal to use in forming the core box. It is strong, light in weight, and is thermally stable at temperatures encountered in the manufacture of the cores and at temperatures at which apparatus containing the cores are operated. If desired, however, other non-magnetic metals such as stainless steel or copper may be used as well as ceramics such as porcelain.

The box 1, if metallic, is given a preliminary coating such as by anodizing, spray or dip coating with a resin, or the like. This preliminary coating serves to insulate the interior of the box and the flange or connection where the two portions of the box join. It is necessary that this joint be insulated in order that the box does not form a shorted turn around the core.

After the box 1 has been so prepared, a magnetic core 2, FIG. 1, is placed in the trough therein together with a suitable dampening compound 3 such as silicone oil or grease or rubber, powdered talc, or the like. A top 4 is then placed in position, a flange 5 of the core box is rolled over to hold top 4 in place and the entire assemblage forming a sealed, boxed magnetic core unit, is given a completely enveloping exterior resin coating applied by a fluidizing process.

Broadly, the fluidizing process includes preheating the metal core box, with the core inside, to a temperature above the melting point of the resin to be applied. The resin, in finely divided form, is fluidized in a container by passing a stream of gas, usually air, upwardly therethrough. When the preheated box is immersed in the fluidized particles, the particles coming in contact with the heated metal box are melted and adhere to the box. Upon withdrawal of the box from the fluidized resin particles, the resin particles adhering to the box flow out over the heated metal and harden to provide a uniform thick coating thereon.

Figure 2:
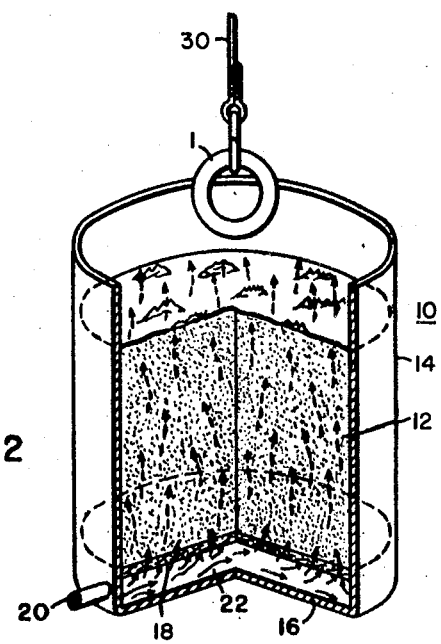
FIG. 2 is a front view, with parts broken away and partly in cross section, illustrating one form of apparatus suitable for use in coating core boxes in accordance with this invention.

FIG. 2 of the drawing illustrates one form of apparatus which has been found to be particularly satisfactory for use in coating metal core boxes in accordance with this invention. Reference numeral 10 refers to a tank adapted to contain a mass of resin particles 12. Tank 10 has a side wall 14 and a bottom wall 16. A porous porcelain plate 18 is mounted in tank 10 near bottom wall 16. A gas inlet 20 is mounted in the tank wall to allow gas to enter the tank into a gas chamber 22 defined by porcelain plate 18 and bottom wall 16.

Parts to be coated, such as a core box 1, are attached to a cable 30 by means of which they may be lowered into and withdrawn from tank 10.

Boxes which are to be coated in accordance with this invention preferably are cleaned prior to immersion into the mass of fluidized resin particles. Such cleaning may be effected, for example, by dipping the parts into either a dilute alkaline or acid washing bath. For only slightly soiled parts, dipping into a detergent and rinsing in water generally is all that is necessary.

Tank 10 is partially filled with the dry powdered resin particles. It has been determined that the resin particles should be of a 50 to 350 mesh size, i.e., will pass through a sieve having from 50 to 350 meshes per lineal inch. A gas, usually air, is injected upwardly through porcelain plate 18 into the bed of powdered resin. The porous plate 18 may be of metal or of sintered ceramic material. The injection of gas into the powdered resin causes the dry powder to be suspended therein so as to appear to increase in volume within the tank 10 and assume the characteristics of a fluid.

Boxes to be coated are heated to a temperature above the melting point of the particular resin being applied. Generally, this will be a temperature within the range of about 100° C. to 300° C. The exact temperature to which the box is heated is dependent not only upon the melting point of the resin to be applied but also upon the desired coating thickness and the thermal content of the box being coated.

Figure 3:
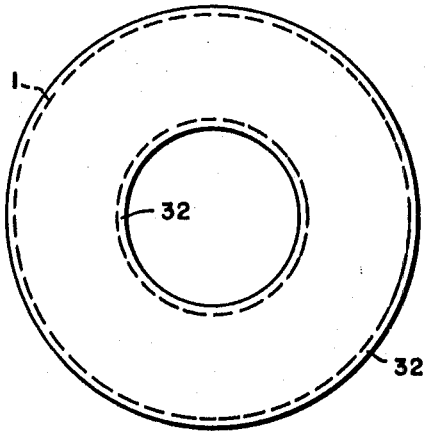
FIG. 3 is a side view of a magnetic core box provided with an exterior resin coating completely enclosing the box and hermetically sealing the same.

The heated box is immersed into the fluidized powdered resin mass for a period of about 2 to 15 seconds. Particles contacting the heated box will melt and adhere thereto. During immersion and immediately upon withdrawal of the box, the melted resin will flow out over the box and will solidify into a smooth uniform coating as the parts cool. If complete melt-flow does not occur, the box may be post-heated in an oven or the like at 100° C.

to 300° C. for a period of time sufficient to permit the development of a smooth coating. The box may be reheated and redipped several times to build up a coating of the desired thickness. A melt-flowed coating 32 (FIG. 3) of a thickness on the order of 4 to 50 mils has been found to be suitable for magnetic core boxes. It will be understood, of course, that the cores, in lieu of being preheated, may be inserted cold into a fluidizing tank provided with induction heating apparatus and heated while in the tank.

The following is a specific example illustrating the coating of a core box. The metal box is heated at a temperature of about 200° C. for a period of from 10 to 20 minutes. The heated box then is dipped for about 10 seconds into a fluidized powder mass comprising 80 parts of finely divided epoxy resin having a 325 mesh size, 16 parts of titanium dioxide, and 4 parts of dicyandiamide. The coated box then is baked at 250° C. to 300° C. for from 15 to 60 minutes. The resulting uniform coating had a thickness of about 30 mils.

The magnetic core is thus hermetically sealed within the core box by a smooth continuous coating of resin. The assemblage then is ready to receive the electrical windings.

Core boxes, coated as just described, then were tested. Breakdown tests showed that the coatings deposited on the boxes had a minimum insulation strength of 3000 volts at 60 cycles. Coated boxes, with wire wound thereon under tension to form coils, showed no coating breakdown even at temperatures as high as 170° C. in heat cycling tests. There was no resin flow of the coating on these boxes as sometimes occurs with cores provided with dip-coated or brushed-on resin coatings. The coatings deposited on the boxes were uniform in thickness and adhered tenaciously to edges of the boxes as well as to the flat surfaces.

The effectiveness of the hermetic coating seal was tested by sumberging a coated core box in oil under a bell jar. A vacuum of 3 mm. Hg was applied for one hour. No bubbling of the oil was observed indicating that the coating seal was air-tight. The boxes were then cut open and no evidence of oil seepage into the boxes was observed.

Coated core boxes prepared in accordance with this invention are suitable for use in pulse transformers, current transformers, saturable reactors, and like electrical apparatus.

Resins which may be applied to magnetic core boxes in accordance with this invention include polyethylenes, polyamides (nylon), cellulosics such as ethyl cellulose, cellulose acetate-butyrate and cellulose acetate, polyvinyl, acrylates, polyesters, epoxies, alkyds, ureas, melamines, phenolics, silicones, polytetrafluoroethylene and polytrifluorochloroethylene, and the like, either singly or in combinations of two or more.

While the present invention has been described with reference to what at present is considered to be the preferred embodiment thereof, it will be understood, of course, that certain changes, substitutions, modifications and the like may be made therein without departing from its true scope.

We claim as our invention:

1. An anodized aluminum core box enclosing a magnetic core and a dampening compound, said core box being hermetically sealed by a 10–30 mil thick coating of a melt-flowed resin consisting of an epoxy resin together with titanium dioxide filler.

2. An anodized aluminum core box enclosing a magnetic core and a dampening compound, said core box being hermetically sealed by a 10–30 mil thick coating of a melt-flowed resin consisting of an epoxy resin together with titanium dioxide filler, and said dampening compound consisting of silicone grease.

3. In combination, an anodized aluminum core box enclosing a magnetic core, a dampening compound surrounding said core, and said core box being hermetically sealed by a melt-flowed resin having a thickness of from 10–30 mils.

4. In combination, an anodized aluminum core box enclosing a magnetic core, a silicone grease dampening compound surrounding said core, and said core box being hermetically sealed by a melt-flowed resin having a thickness of from 10–30 mils.

References Cited in the file of this patent

UNITED STATES PATENTS

| | | |
|---|---|---|
| 1,947,112 | Ruben | Feb. 13, 1934 |
| 2,310,820 | Walters | Feb. 9, 1943 |
| 2,909,741 | Arnitzen et al. | Oct. 20, 1959 |
| 2,999,215 | Lufcy et al. | Sept. 5, 1961 |
| 3,018,455 | Brandon et al. | Jan. 23, 1962 |